United States Patent [19]

Park

[11] Patent Number: 5,567,162

[45] Date of Patent: Oct. 22, 1996

[54] KARAOKE SYSTEM CAPABLE OF SCORING SINGING OF A SINGER ON ACCOMPANIMENT THEREOF

[75] Inventor: Chan Soo Park, Seoul, Rep. of Korea

[73] Assignee: Daewoo Electronics Co., Ltd., Seoul, Rep. of Korea

[21] Appl. No.: 334,113

[22] Filed: Nov. 4, 1994

[30] Foreign Application Priority Data

Nov. 9, 1993 [KR] Rep. of Korea ............... 93-23724
Nov. 30, 1993 [KR] Rep. of Korea ............... 93-25869

[51] Int. Cl.⁶ .................. G10H 1/36; G09B 5/08
[52] U.S. Cl. ............. 434/307 A; 434/318; 434/365; 84/477 R; 84/615; 395/2.79
[58] Field of Search ............. 434/307 R, 307 A, 434/308, 309, 318, 365; 84/423 R, 454, 477 R, 601, 609, 610, 611, 615, 625, 645; 395/2.79, 154; 360/19.1, 33.1, 77.01; 348/478, 484, 571, 595, 750; 358/310, 311, 341, 342, 335

[56] References Cited

U.S. PATENT DOCUMENTS

| | | | |
|---|---|---|---|
| 4,546,690 | 10/1985 | Tanaka et al. | 84/477 R |
| 5,127,303 | 7/1992 | Tsumura et al. | 84/609 |
| 5,130,966 | 7/1992 | Yoshio et al. | 369/49 |
| 5,287,789 | 2/1994 | Zimmerman | 84/477 R |
| 5,300,723 | 4/1994 | Ito | 84/601 |
| 5,395,123 | 3/1995 | Konodo | 434/307 A |
| 5,434,949 | 7/1995 | Jeong | 395/2.79 |

*Primary Examiner*—Joe Cheng
*Attorney, Agent, or Firm*—Oliff & Berridge

[57] ABSTRACT

In a karaoke system capable of scoring a singing of singer on an accompaniment thereof, when a voice signal of the singer is inputted, an energy detector generates a first basic frequency signal with respect to a voice signal section and inputs the first basic frequency signal to a comparator. And then, an audio signal in the voice signal section is inputted to the comparator as a second basic frequency signal. The comparator compares the first and second basic frequency signals with each other and calculates a difference value therebetween, and then inputs it to a microprocessor. The microprocessor outputs a signal for scoring the singing of the singer on the basis of the difference value.

2 Claims, 3 Drawing Sheets

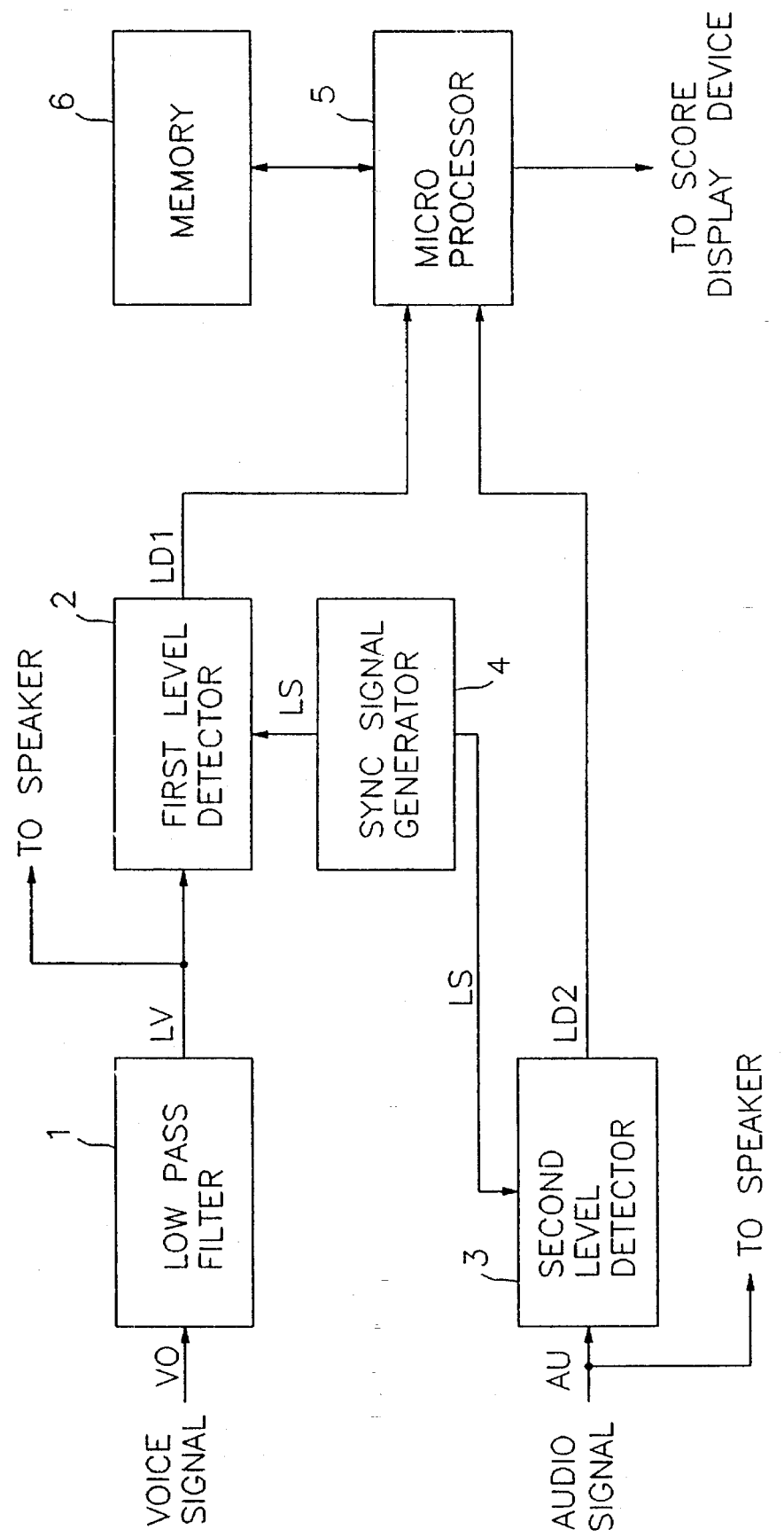

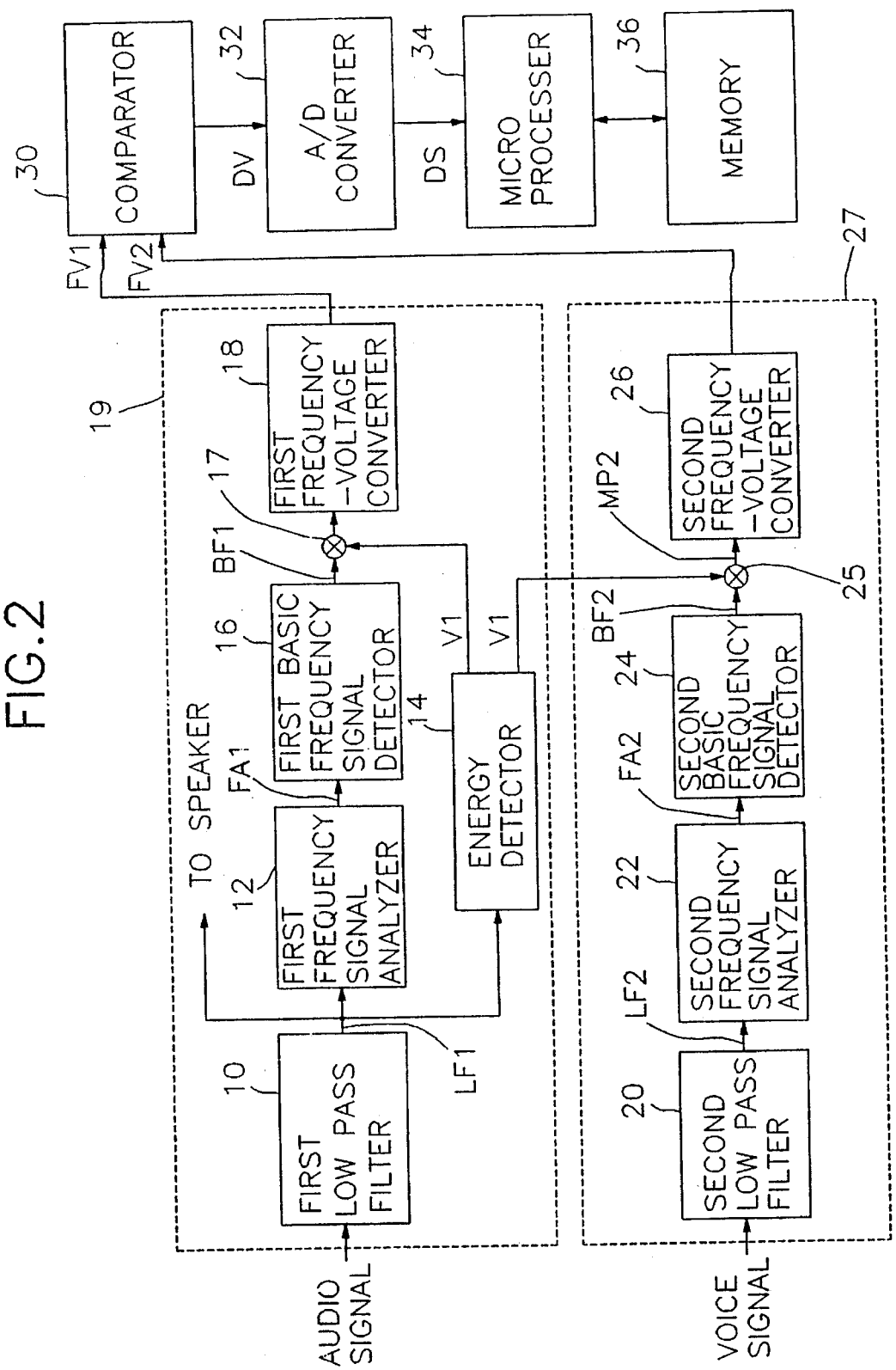

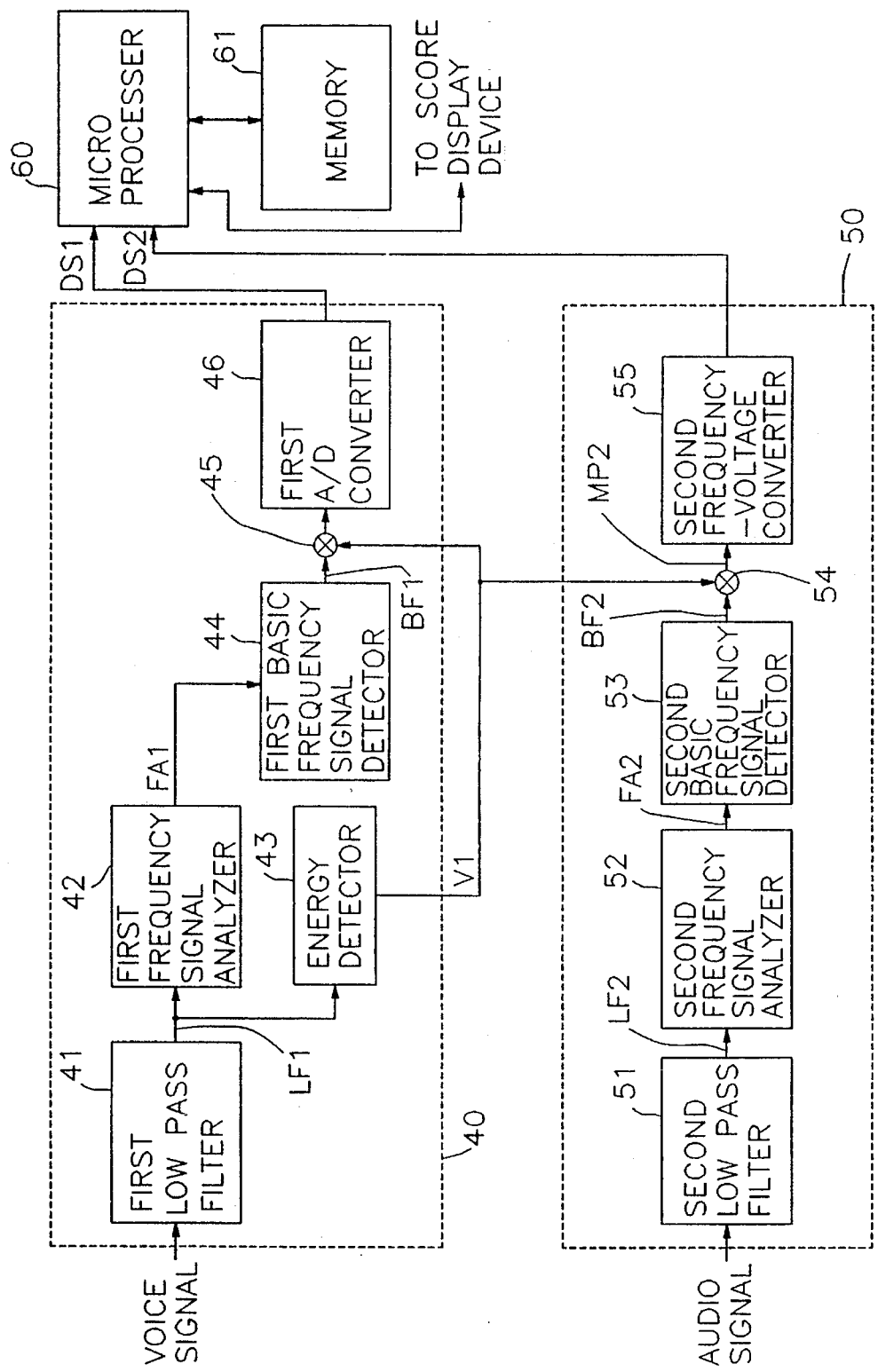

KARAOKE SYSTEM CAPABLE OF SCORING SINGING OF A SINGER ON ACCOMPANIMENT THEREOF

BACKGROUND OF THE INVENTION

1. Field of the Invention

The present invention relates to a karaoke system capable of scoring singing of a singer on accompaniment thereof, in which a compact disk or a laser disk is used for the accompaniment.

2. Description of the Prior Art

In a conventional karaoke system, a voice, or a singing sound of a singer is inputted through a microphone and then transformed into a voice signal. This voice signal is inputted into and then amplified in an amplifier. The amplified voice signal is filtered through a low pass filter and then outputted through speakers. At the same time, an audio signal accompanied with the singing of the singer is outputted through the speakers from an audio system of the karaoke system.

FIG. 1 is a block diagram of a conventional karaoke system showing a process of scoring the singing of a singer on accompaniment thereof.

As shown in FIG. 1, in the conventional system, the voice of the singer is inputted through the microphone, which is not shown, and is transformed into a voice signal VO and then is outputted to a low pass filter 1 by the microphone. A low pass filter 1 low-pass filters voice signal VO so as to eliminate noise signals therefrom, and then outputs a low pass filter signal LV. Low pass filter signal LV is inputted into speakers and a first level detector 2. First level detector 2 detects a signal level of low pass filter signal LV and outputs a first level detection signal LD1.

Meanwhile, an audio signal AU including a voice signal of a professional singer or an accompaniment signal generated from an audio device, which is not shown, of the karaoke system is outputted into the speakers and a second level detector 3, and second level detector 3 detects a level of audio signal AU to generate a second level detection signal LD2. First and second level detectors 2 and 3 are synchronized with each other according to a sync signal LS of a sync signal generator 4, and then first level detection signal LD1 from first level detector 2 and second level detection signal LD2 from second level detector 3 are synchronized with each other and then inputted into a microprocessor 5.

Microprocessor 5 computes level differences between signals LD1 and LD2, and stores up the level differences in a memory 6 until the singing of the singer is finished. After the singing is finished, the microprocessor sums up all the level differences, and outputs a score calculated on the basis of the level differences to a score display device which is not shown. In this case, it goes without saying that the less the sum of the level differences is, the higher the score is.

However, in the conventional karaoke system capable of scoring the singing of the singer on accompaniment thereby as shown in FIG. 1, since the score of the singing of the singer is calculated on the basis of only the level difference, which is a difference of energy between the signals inputted in the microprocessor, other factors such as a tempo, a tone, etc., of the singing of the singer are not taken into consideration. In other words, when the level of the singing of the singer is similar to that of the audio signal, the score is estimated to be high.

Accordingly, there has been a disadvantage in that a reliability has not been given to the scoring by the conventional karaoke system.

SUMMARY OF THE INVENTION

The present invention has been made to overcome the above disadvantage, and therefore it is an object of the present invention to provide a karaoke system capable of reliably scoring singing of a singer on accompaniment thereby.

To achieve the above object, in a karaoke system according to one embodiment of the present invention, when a voice signal of a singer is inputted, an energy detector generates a first basic frequency signal with respect to a voice signal section and inputs the first basic frequency signal to a comparator. And then, an audio signal in the voice signal section is inputted to the comparator as a second basic frequency signal. The comparator compares the first and second basic frequency signals with each other and calculates a difference value therebetween, and then inputs it to a microprocessor. The microprocessor outputs a score of the singing of the singer on the basis of the difference values.

In a karaoke system according to another embodiment of the present invention, when an audio signal of the karaoke system is inputted, a first basis frequency signal with respect to an audio signal section is generated and inputted into a microprocessor by means of an energy detector, a voice signal of the singer in the audio signal section is inputted to the microprocessor as a second basic frequency signal. The microprocessor compares the first and second basic frequency signals with each other to compute a difference value therebetween, and then calculates the score of the singing of the singer on the basis of the difference values.

The present invention provides a karaoke system which can reliably score the singing of a singer on an accompaniment thereby, taking the tempo and the tone of the singing into consideration.

BRIEF DESCRIPTION OF THE DRAWINGS

The above object and other advantages of the present invention will become more apparent by describing in detail a preferred embodiment thereof with reference to the attached drawings in which:

FIG. 1 is a block diagram of a conventional karaoke system showing a process of scoring the singing of a singer on an accompaniment thereby;

FIG. 2 is a block diagram of a karaoke system showing a process of scoring the singing of a singer on an accompaniment thereby according to one embodiment of the present invention; and FIG. 3 a block diagram of a karaoke system showing a process of scoring the singing of a singer on an accompaniment thereby according to another embodiment of the present invention.

DESCRIPTION OF THE PREFERRED EMBODIMENT

FIG. 2 is a block diagram of a karaoke system showing a process of scoring the singing of a singer on an accompaniment thereby according to a first embodiment of the present invention.

As shown in FIG. 2, the karaoke system includes a voice signal processing section 19 for generating a first basic frequency which is obtained by adopting Fourier Transformation to a voice signal inputted thereto, and outputting a first voltage signal which corresponds to a voice frequency signal existing in the region of voice signal section of the first basic frequency; an audio signal processing section 27 for generating a second basic frequency obtained from an audio signal inputted thereto by Fourier Transformation, and outputting a second voltage signal which corresponds to an audio frequency signal existing in the region of a voice signal section of the second frequency signal; a comparator 30 for comparing the first and the second voltage signals respectively inputted from voice signal processing section 19 and audio signal processing section 27 so as to output a difference signal therebetween;an A/D converter 32 for converting the difference signal inputted from comparator 30 to a digital signal so as to output the digital signal; and a microprocessor 34 for summing the digital signals continuously inputted thereto in order to output a score display signal calculated on the basis of the sum of the digital signals to a score display device.

Hereinafter,a process of scoring the singing of a singer by the karaoke system according to the embodiment of the present invention will be described.

First, a voice signal of a singer is inputted to a low pass filter 10 of voice signal processing section 19. Low pass filter 10 passes only a signal having a frequency in the voice signal band therethrough, and then outputs a first low pass filter signal LF1 to speakers, a first frequency signal analyzer 12 and an energy detector 14, respectively. First frequency signal analyzer 12 analyzes the frequency of the inputted first low pass filter signal LF1 by means of Fourier Transformation and then outputs a first frequency analysis signal FA1 to a first basic frequency signal detector 16. Meanwhile, energy detector 14 inspects the level of inputted first low pass filter signal LF1 to generate voice section signal VI for determining a voice signal section in which the voice of the singer is entrained, and then outputs the signal VI to a first multiplier 17 and a second multiplier 25 of audio signal processing section.

First basic frequency signal detector 16 detects a signal having a level above a reference value and outputs it to first multiplier 17 as a first basic frequency signal BF1. First multiplier 17 multiplies inputted first basic frequency signal BF1 by voice section signal VI to generate a first multiplication signal MP1 and output it to a first frequency-voltage converter 18. First multiplication signal MP1 is a basic frequency signal in the voice signal section. First frequency-voltage converter 18 converts inputted first multiplication signal MP1 to a corresponding voltage and outputs a first frequency-voltage conversion signal FV1 to comparator 30.

In the meantime, an audio signal including a singing signal of a professional singer or an accompaniment signal generated in the karaoke system is outputted to speaker, which is not shown, and a second low pass filter 20. Low pass filter 20 permits to pass therethrough a signal in a low frequency band of the audio signal to generate a second low pass filter signal LF2 and output it to a second frequency signal analyzer 22.

Second frequency signal analyzer 22 analyzes the frequency of inputted second low pass filter signal LF2 to output a second frequency analysis signal FA2 to a second frequency detector 24 as is first frequency signal analyzer 12.

Second frequency detector 24 detects a basic frequency of inputted second frequency analysis signal FA2, and outputs it to a second multiplier 25 as a second basic frequency signal BF2. Second basic frequency signal BF2 multiplied by voice section signal VI in second multiplier 25 to generate a second multiplication signal MP2 is outputted to a second frequency-voltage converter 26.

Second multiplication signal MP2 is a basic frequency signal existing in the voice signal section of the audio signal. Second frequency-voltage converter 26 converts inputted second basic frequency signal BF2 to a corresponding voltage so as to output a second frequency-voltage conversion signal FV2 to comparator 30.

Comparator 30 receives first and second frequency-voltage conversion signals FV1 and FV2 to generate a voltage-difference signal DV therebetween and output it to A/D converter 32. A/D converter 32 converts voltage-difference signal DV into a digital signal DS and then outputs it to microprocessor 34.

Finally, microprocessor 34 stores up digital signals DS continuously inputted thereinto in a memory 36 until the singing is finished, and then sums up digital signals DS stored in the memory 36 after the singing is finished. The microprocessor calculates a score on the basis of the sum and outputs the score through a score display device which ie not shown. As described above, the less the sum of the level differences is and the closer the voice and audio signals are to each other, the higher the score is.

FIG. 3 is a block diagram of a karaoke system showing a process of scoring the singing of a singer on an accompaniment hereby according to second embodiment of the present invention.

While the score of the singing is calculated on the basis of a voice signal of a singer in the first embodiment of the present invention shown in FIG. 2, the score is calculated on the basis of an audio signal in the second embodiment shown in FIG. 3.

However, the respective calculable principles in the two embodiments are similar to each other.

According to the second embodiment of the invention, the Karaoke system includes an audio signal processing section 40 for generating a first basic frequency which is obtained by adopting Fourier Transformation to audio signal inputted thereto, and outputting a first digital signal which corresponds to an audio frequency signal existing in the region of an audio signal section of the first basic frequency signal; a voice signal processing section 50 for generating a second basic frequency by adopting Fourier Transformation to a voice signal inputted thereto, and outputting a second digital signal existing in the region of the audio signal section of the second basic frequency; and a microprocessor 60 for summing the first and the second digital signals continuously inputted thereto respectively from voice signal processing section 19 and audio signal processing section 40 in order to output a score display signal calculated on the basis of the sum of the digital signals to a score display device.

Hereinafter, a process of scoring the singing of a singer by the karaoke system according to the second embodiment of the present invention will be described.

First, an audio signal including a singing signal of a professional singer or an accompaniment signal generated in the karaoke system is outputted to a low pass filter 41 of audio signal processing section 41. Low pass filter 41 permits to pass therethrough an accompaniment signal of a specific musical instrument in a low frequency band in case that a voice signal of a professional singer is not included in the voice signal, so as to output the accompaniment signal to a first frequency signal analyzer 42 and an energy detector 43 as a first low pass filter signal LF1. First frequency signal analyzer 42 analyzes the frequency of first low pass filter signal LF1 by Fourier Transformation to output a first frequency analysis signal FA1 to a basic frequency signal detector 44. Energy detector 43 inspects the level of inputted first low pass filter signal LF1 and generates an audio section signal VI for determining an audio signal section to output it to a first and second multipliers 45 and 46.

Meanwhile, first basic frequency signal detector 44 detects a signal having a level above a reference value from inputted first frequency analysis signal FA1, so as to generate e first basic frequency signal BF1 and then output it to first multiplier 45. First multiplier 45 multiplies audio section signal VI by first basic frequency signal BF1 to generate a first multiplication signal MP1 and output it to first A/D converter 46.

First A/D convert 46 converts first multiplication signal MP1 into e first digital signal DS1 and outputs it to microprocessor 60.

A voice signal of a singer is outputted to a second low pass filter 51 of voice signal processing section 50 through a microphone which is not shown. Second low pass filter permits to pass therethrough only a signal in a frequency band of the voice signal of the singer, so as to output it to a second frequency signal analyzer 52 as a second low pass filter signal LF2. Second frequency signal analyzer 52 analyzes the frequency of inputted second low pass filter signal LF2 by Fourier Transformation, and then outputs a second frequency analysis signal FA2 to a second basic frequency detector 53.

Second basic frequency detector 53 detects the basic frequency of second frequency analysis signal FA2 so as to output it to second multiplier 54 as a second basic frequency signal BF2. Second multiplier 54 multiplies inputted audio section signal VI by second basic frequency signal BF2 so as to output a second multiplication signal MP2 to a second A/D converter 55. Second multiplication signal MP2 is a voice signal existing in an audio signal section. Second A/D converter 54 converts inputted second multiplication signal MP2 into second digital signal PS2 and then outputs it to microprocessor 60.

Lastly, microprocessor 60 compares the continuously inputted first and second digital signals PS1 and PS2 with each other and computes the difference values therebetween, and then stores up the computed values in a memory 61 until the singing is finished. After the singing is finished, the microprocessor sums up the difference values stored in the memory, and calculates a score of the singing on the basis of the sum and outputs the score through a score display device which is not shown. When the sum is small, that is, when the similarity between the audio signal and the voice signal is high, the score is calculated to be high.

As described above, according to the present invention, there is provided a karaoke system by which a singing of a singer on an accompaniment of the karaoke system can be scored reliably and precisely.

It should be understood although preferred embodiments of the invention have been described in detail above,many modifications and variations could be effected therein by those who are skilled in the art without departing from the spirit and scope of the invention as defined by the appended claims.

What is claimed is:

1. A karaoke system capable of scoring singing of a singer on accompaniment thereof comprising:

a voice signal processing means for generating a first basic frequency signal which is obtained by adopting Fourier Transformation to a voice signal generated by the singer, and outputting a first voltage signal which corresponds to a voice frequency signal existing in a voice signal section of the first basic frequency signal;

an audio signal processing means for generating a second basic frequency signal obtained by adopting Fourier Transformation to an audio signal generated by the karaoke system, and outputting a second voltage signal which corresponds to an audio frequency signal existing in a voice signal section of the second basic frequency signal;

a comparator for comparing the first and second voltage signals respectively inputted from the voice signal processing means and the audio signal processing means so as to output a difference signal therebetween;

an A/D converter for converting the difference signal inputted from the comparator to a digital signal; and a microprocessor for summing the first and second digital signals continuously inputted thereto in order to output a score display signal calculated on the basis of the sum of the first and second digital signals into a score display device, wherein the voice signal processing means comprises:
a first low pass filter for filtering the voice signal generated by the singer and generating a first low pass filter signal;
a first frequency signal analyzer for analyzing a frequency of the first low pass filter signal and generating a first frequency analysis signal;
an energy detector for detecting the level of the first low pass filter signal and generating a voice section signal to determine a voice signal section of the first low pass filter signal;
a first basic frequency detector for detecting the first basic frequency signal having a level above a predetermined value in the voice signal section of the first frequency analysis signal;
a first multiplier for multiplying the first basic frequency signal and the voice section signal and generating a first multiplication signal;
a first frequency-voltage converter for converting the first multiplication signal into a first voltage signal corresponding to the first multiplication signal as a first frequency-voltage conversion signal to the comparator, and wherein the audio signal processing means comprises:
a second low pass filter to filtering the audio signal generated by the karaoke system and generating a second low pass filter signal;
a second frequency signal analyzer for analyzing a frequency of the second low pass filter signal and generating a second frequency analysis signal;
a second basic frequency detector for detecting the second basic frequency signal having a level above a predetermined value in the voice signal section of the second frequency analysis signal;
a second multiplier for multiplying the second basic frequency signal and the voice section signal and generating a second multiplication signal; and
a second frequency-voltage converter for converting the second multiplication signal into a second voltage signal corresponding to the second multiplication signal as a second frequency-voltage conversion signal to the comparator.

2. A karaoke system capable of scoring singing of a singer on accompaniment thereof comprising:

an audio processing means for generating a first basic frequency signal which is obtained by adopting Fourier Transformation to an audio signal voice signal generated by the karaoke system, and outputting a first digital signal which corresponds to an audio frequency signal existing in a region of an audio signal section of the first basic frequency signal;

a voice signal processing means for generating a second basic frequency signal obtained by adopting Fourier Transformation to a voice signal generated by the singer, and outputting a second digital signal existing in the region of the audio signal section of the second basic frequency signal; and a microprocessor for summing the first and second digital signals continuously inputted thereto respectively from the voice signal processing means and the audio signal processing means to output a score display signal calculated on the basis of the sum of the first and second digital signals to a score display device, wherein the audio signal processing means comprises:

a first low pass filter for filtering the audio signal generated by the karaoke system and generating a first low pass filter signal;

a first frequency signal analyzer for analyzing a frequency of the first low pass filter signal and generating a first frequency analysis signal;

an energy detector for detecting the level of the first low pass filter signal and generating an audio section signal to determine an audio signal section of the first low pass filter signal;

a first basic frequency detector for detecting the first basic frequency signal having a level above a predetermined value in the audio signal section of the first frequency analysis signal;

a first multiplier for multiplying the first basic frequency signal and the audio section signal and generating a first multiplication signal; and a first A/D converter for converting the first multiplication signal into a first digital signal corresponding to the first multiplication signal to the microprocessor, and wherein the voice signal processing means includes:

a second low pass filter to filtering the voice signal generated by the singer to the voice signal processing means and generating a second low pass filter signal;

a second frequency signal analyzer for analyzing a frequency of the second low pass filter signal and generating a second frequency analysis signal;

a second basic frequency detector for detecting the second basic frequency signal, which is the voice signal existing in the audio signal section of the second frequency analysis signal;

a second multiplier for multiplying the second basic frequency signal and the audio section signal inputted thereto from the energy detector of the audio signal processing means and generating a second multiplication signal; and a second A/D converter for converting the second multiplication signal into a second digital signal corresponding to the second multiplication signal to the microprocessor.

* * * * *